United States Patent
Vreeken

(10) Patent No.: US 9,759,361 B2
(45) Date of Patent: Sep. 12, 2017

(54) PIPE SEAL

(71) Applicant: Trelleborg Pipe Seals Lelystad BV, Lelystad (NL)

(72) Inventor: Johannes Vreeken, Lelystad (NL)

(73) Assignee: Trelleborg Pipe Seals Lelystad BV, Lelystad (NL)

( * ) Notice: Subject to any disclaimer, the term of this patent is extended or adjusted under 35 U.S.C. 154(b) by 0 days.

(21) Appl. No.: 14/692,611

(22) Filed: Apr. 21, 2015

(65) Prior Publication Data
US 2016/0312933 A1  Oct. 27, 2016

(51) Int. Cl.
*F16L 25/00* (2006.01)
*F16J 15/02* (2006.01)

(52) U.S. Cl.
CPC ......... *F16L 25/0054* (2013.01); *F16J 15/025* (2013.01)

(58) Field of Classification Search
CPC . F16L 21/04; F16L 5/02; F16L 21/035; F16L 21/03; F16L 5/10; F16L 15/06; F16L 25/0054; F16L 21/02; F16L 17/025; F16J 15/061; F16J 15/062; F16J 15/025
See application file for complete search history.

(56) References Cited

U.S. PATENT DOCUMENTS

| | | | | |
|---|---|---|---|---|
| 3,547,471 A * | 12/1970 | Dunmire | ................ | F16L 21/04 285/337 |
| 4,304,415 A * | 12/1981 | Wolf | ................ | F16L 47/065 277/615 |
| 4,487,421 A * | 12/1984 | Housas | ................ | B29D 99/0053 277/616 |
| 5,415,436 A * | 5/1995 | Claes | ................ | F16L 25/0045 285/110 |
| 5,687,976 A * | 11/1997 | Andrick | ................ | F16J 15/027 277/605 |
| 5,992,469 A * | 11/1999 | Hegler | ................ | B29C 47/0023 138/109 |
| 6,082,741 A * | 7/2000 | Gregoire | ................ | F16J 15/32 277/604 |
| 6,126,209 A * | 10/2000 | Goddard | ................ | F16L 11/15 285/3 |
| 6,343,623 B2 * | 2/2002 | Hegler | ................ | 138/109 |
| 6,367,802 B1 * | 4/2002 | Knapp | ................ | F16L 21/03 277/314 |
| 6,550,775 B2 * | 4/2003 | Knapp | ................ | F16L 21/03 277/314 |
| D557,387 S * | 12/2007 | Darce | ................ | D23/269 |
| 2001/0027818 A1 * | 10/2001 | Hegler | ................ | F16L 21/035 138/109 |
| 2006/0192349 A1 * | 8/2006 | Knapp | ................ | F16L 17/025 277/608 |
| 2010/0140925 A1 * | 6/2010 | Raper | ................ | F16L 37/0925 285/136.1 |
| 2011/0187059 A1 * | 8/2011 | Chinchilla | ................ | F16L 21/035 277/625 |

* cited by examiner

*Primary Examiner* — Eugene G Byrd
(74) *Attorney, Agent, or Firm* — Knobbe Martens Olson & Bear, LLP

(57) ABSTRACT

A seal is provided that includes a body, a left arm extending from the body and having an anti-rotation portion, and a right arm extending from the body and having an anti-rotation portion. The seal further includes a lip extending from the body between the left and right arms. The lip is sized and shaped to contact an inside surface of the socket when the first and second pipes are assembled together.

18 Claims, 3 Drawing Sheets

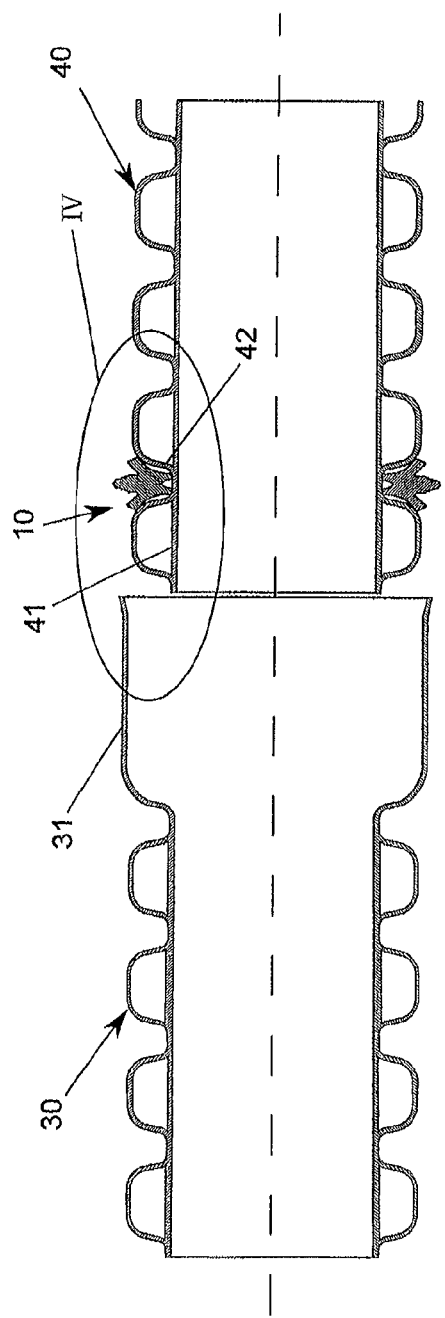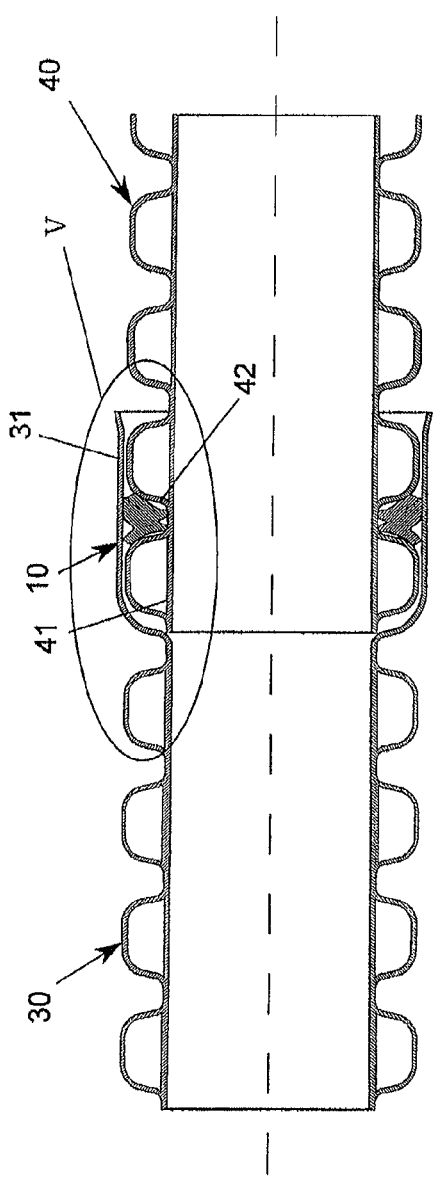

PIPE SEAL

BACKGROUND OF THE INVENTION

Field of the Invention

The present invention relates to seals for the joining of pipes. More specifically, the invention relates to a lip seal for sealing a space connecting a socket of one pipe to the spigot of another pipe.

Description of the Related Art

Pipe seals have been designed for the sealing of structured wall pipes (SWP). Exemplary structured wall pipes include double wall corrugated pipe. The pipe seal is located in a first groove or channel of the spigot pipe. After assembling the pipes, the seal seals the space between the socket of one pipe and the spigot of the other pipe. However, there is no standard size for the groove. For example, the size and shape of the groove may range from small to large and/or from wide to narrow. Thus, there is a wide range of groove shapes and sizes for structured wall pipes.

Pipe seals for structured wall pipes can have a cross-sectional shape that is symmetrical or non-symmetrical. Symmetrical seals avoid the problem of the operator placing the seal backwards in the groove of the spigot pipe prior to assembly of the pipes. Non-symmetrical seals rely on the operator to correctly orient the seal in the groove of the spigot pipe. The sealing ability of a non-symmetrical seal incorrectly placed in the groove may be compromised.

Pipe seals can be classified as lip seals or compression seals. Rubber of the lip seal is bent during assembly of the pipes. In contrast, rubber of the compression seal is pushed or compressed down during assembly of the pipes. In certain applications, lip seals provide advantages over compression seals. For example, lip seals have less rubber volume, are easier to stretch onto the spigot of the pipe, ease assembly of the pipes especially pipes with smaller gaps, require lower assembly force, and are self-locking (no push back).

However, SWP with wide grooves are difficult to seal using symmetrical lip seals. Symmetrical lip seals have a tendency to rotate in the wide groove during assembly jeopardizing the pipe seal's sealing function.

Accordingly, there is a need for a symmetrical pipe seal that is resistant to rotating during assembly even within wide grooves.

SUMMARY OF THE INVENTION

The devices of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Preferred Embodiments," one will understand how the features of the pipe seals disclosed herein provide several advantages over current designs.

One embodiment is a seal for sealing between a first pipe having a groove and a second pipe having a socket. The socket is sized and shaped to cover the groove when the first and second pipes are assembled together. The seal includes a body, a left arm extending from the body and having an anti-rotation portion, a right arm extending from the body and having an anti-rotation portion, and a lip extending from the body between the left and right arms. The lip is sized and shaped to contact an inside surface of the socket when the first and second pipes are assembled together.

Another embodiment is a seal for sealing between a first pipe having a groove and a second pipe having a socket. The socket is sized and shaped to cover the groove when the first and second pipes are assembled together. The seal includes a body having at least two anti-rotation portions and a lip disposed therebetween. The body has a W cross-sectional shape at least when the seal is not assembled between the first and second pipes.

Another embodiment is a method of installing a seal between a first pipe having a groove and a second pipe having a socket. The socket is sized and shaped to cover the groove when the first and second pipes are assembled together. The method includes providing a seal having a body, a left arm extending from the body, a right arm extending from the body, and a lip disposed between the left and right arms. The method further includes locating the seal in the groove so that the lip extends in a direction away from the groove, contacting the lip of the seal with an inside surface of the socket so as to bend the lip towards one of the left and right arms, and contacting the one of the left and right arms contacted by the lip with a top surface of the groove. The method further includes contacting the one of the left and right arms not contacted by the lip with the inside surface of the socket so as to resist rotation of the seal in the groove while the first and second pipes are being assembled.

Further aspects, features and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention. Some embodiments will be described in conjunction with the appended drawings, where like designations denote like elements.

FIG. 2 is a cross-section view of a socket end of a pipe aligned with the spigot end of the pipe from FIG. 1 with the seal disposed in the groove of the spigot end;

FIG. 3 is a cross-section view of the socket end of the pipe and the spigot end of the pipe from FIG. 2 assembled and showing a lip portion of the seal bent towards the spigot side of the assembly;

DETAILED DESCRIPTION OF THE PREFERRED EMBODIMENTS

Figure 1:
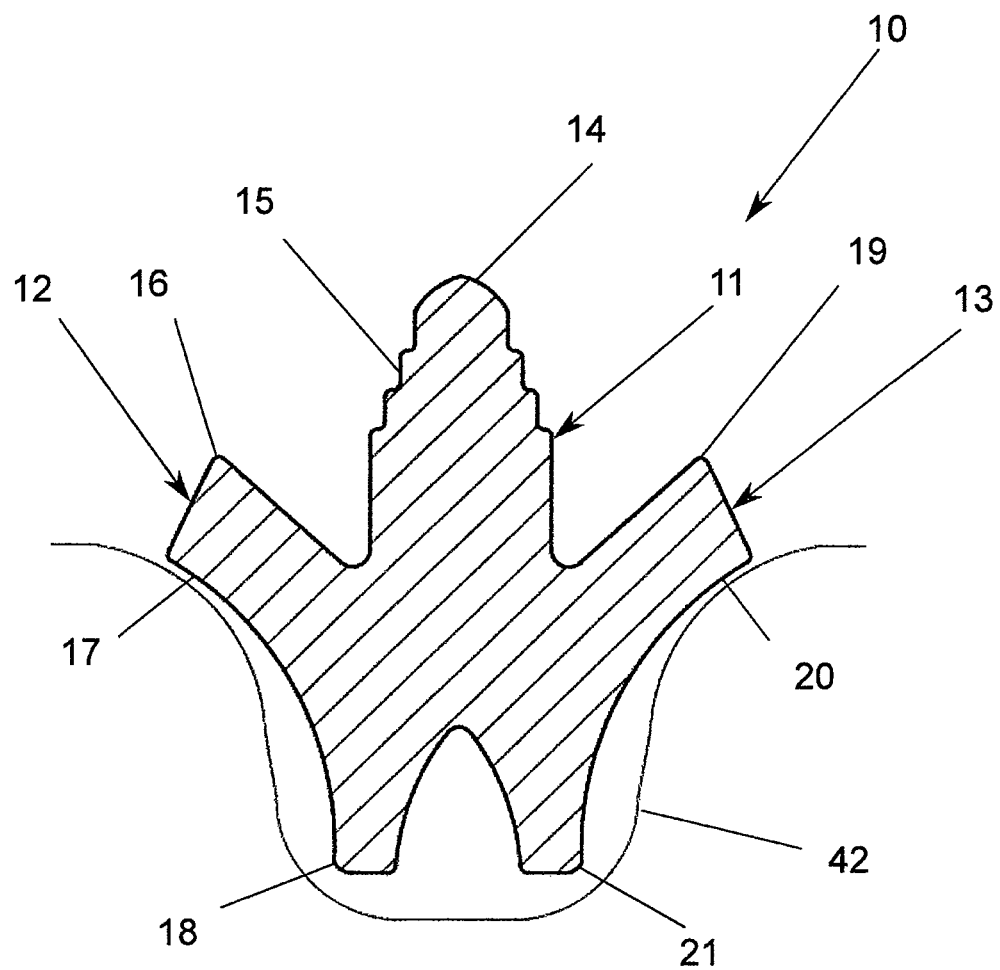
FIG. 1 is a cross-section view of an embodiment of a seal disposed in a groove of a spigot end of a pipe according to a preferred embodiment of the present invention.

The following detailed description is directed to certain specific embodiments of the invention. However, the invention can be embodied in a multitude of different ways as defined and covered by the claims. In this description, reference is made to the drawings wherein like parts are designated with like numerals throughout.

Embodiments of the seal are preferably symmetrical and therefore, the seal is always placed correctly in the groove of the spigot end of the pipe. In certain embodiments, the seal comprises a lip radially extending from a main body of the seal. The seal may further comprise a left arm and a right arm disposed on opposite sides of the lip. During assembly of the pipes, the lip is bent towards the left or right arm which requires relatively low force. The low force eases assembly of the pipes.

In certain embodiments, the seal provides additional sealing for the assembled joint. For example, a portion of the seal can contact an upper surface of the groove. In such an embodiment, portions of the seal also contact a bottom surface of the groove as well as an inside surface of the socket. The lip assures adequate sealing even when the gap between the socket and spigot is large. For example, large gaps are created when a spigot having a small diameter is inserted into a socket having a large diameter. Additional deformation of the lip of the seal is required to seal these large gaps. In certain embodiments, the lip of the seal locks the pipes together in addition to providing a sealing function. For example, the bent lip of the seal resists the spigot from being removed from the socket once assembled.

In certain embodiments, the seal comprises a relatively low volume of rubber while still achieving its sealing function. For example, the volume of the rubber can be about the same as the volume of the groove. In certain embodiments, the seal can be employed between spigot and socket combinations that have minimum gaps. Minimum gaps occur when the assembly includes a spigot having a large diameter and a socket having a small diameter. The low rubber volume of the seal also lowers the production costs as compared to compression seals.

In certain embodiments, the seal comprises one or more anti-rotation structures. For example, in some embodiments, the seal comprises a left arm and a right arm. The left arm can comprises a first anti-rotation portion and a first lower contact portion. The first anti-rotation portion and the first lower contact portion are configured to inhibit rotation of the seal during assembly. For example, with reference to FIGS. 4 and 5, the first anti-rotation portion and the first lower contact portion of the left arm inhibit clockwise rotation of the seal in the groove. The left arm may further comprise a first upper contact portion that is configured to inhibit dirt, ice, etc. from entering the groove before assembly.

The right arm can comprises a second anti-rotation portion and a second lower contact portion. The second anti-rotation portion and the second lower contact portion are configured to inhibit rotation of the seal during assembly. For example, with reference to FIGS. 4 and 5, if the orientation of the seal was reversed from what is illustrated in those figures resulting in the right arm being on the left side of the seal, the second anti-rotation portion and the second lower contact portion of the right arm would inhibit clockwise rotation of the seal in the groove. The right arm may further comprise a second upper contact portion that is configured to inhibit dirt, ice, etc. from entering the groove before assembly.

In certain embodiments, the seal comprises stress rips. The stress rips may be disposed on one or more surfaces of the lip. The stress rips can improve the sealing performance of the lip by providing focused contact locations with the inside surface of the socket. By focusing contact in this way the seal is able to maintain its sealing function even when the seal is exposed to high pressure.

FIG. 1 is a cross-section view of an embodiment of a seal 10 according to a preferred embodiment of the present invention. The seal 10 is used for sealing two structured pipes 30, 40 as most clearly shown in FIGS. 2 and 3. The first pipe 30 comprises a socket 31 and the second pipe 40 comprises a spigot 41. Referring back to FIG. 1, the seal 10 is disposed in a groove 42 of the spigot 41 end of the pipe 40. In symmetrical embodiments, the seal 10 is always placed correctly in the groove 42 of the spigot 41 end of the pipe 40.

The seal 10 preferably has an O-ring or torus shape. In certain embodiments, the seal 10 has a W-shaped cross section. In certain embodiments, the seal 10 has a V-shaped cross section. The seal 10 comprises a main body 11 having one or more anti-rotation portions or features. In certain embodiments, first and second anti-rotation portions 16, 19 are disposed on a left arm 12 and a right arm 13, respectively, of the seal 10. For example, the first anti-rotation portion 16 can be disposed on a distal end of the left arm 12. Similarly, the second anti-rotation portion 19 can be disposed on a distal end of the right arm 13. Other structures of the seal 10 besides the first and second anti-rotation portions 16, 19 can also inhibit rotation of the seal 10 as described below.

In certain embodiments, the seal 10 comprises a lip 14. In the illustrated embodiment, the lip 14 is disposed between the left and right arms 12, 13. In certain embodiments, the lip 14 extends in a radial direction away from the main body 11. In certain embodiments, the lip 14 extends farther away from the main body 11 than the first and second anti-rotation portions 16, 19 so that a top surface of the lip 14 is above top surfaces of the left and right arms 12, 13. Of course the lip 14 need not extend precisely away from the main body 11 in the radial direction and may instead extend substantially in the radial direction while still achieving its sealing function with the socket 31.

In certain embodiments, the lip 14 comprises one or more stress rips 15. The stress rips 15 may be disposed on one or more surfaces of the lip 14. The one or more stress rips 15 may be equally spaced along a length of the lip 14, have variable spacing, or be clustered at a location on the lip 14. Each of the stress rips 15 may be continuous along the surface of the lip 14. For example, each of the stress rips 15 may form a continuous circular ridge concentric with the O-ring shaped seal 10. In the illustrated embodiment, the number of stress rips 15 on a left side of the lip 14 is the same as the number of stress rips 15 on a right side of the lip 14. Of course, the number of stress rips 15 on the left side of the lip 14 need not be the same as the number of stress rips 15 on the right side of the lip 14. In certain embodiments, the stress rips 15 improve the sealing performance of the lip 14 by providing focused contact locations with the inside surface of the socket 31. By focusing contact in this way the seal 10 is able to maintain its sealing function even when the seal 10 is exposed to high pressure.

In certain embodiments, the left arm 12 comprises a first upper contact portion 17 and a first lower contact portion 18. The first upper and lower contact portions 17, 18 may be disposed on distal surfaces of the left arm 12. For example, the first upper and lower contact portions 17, 18 may be disposed on upper and lower distal surfaces of the left arm 12 as shown in FIG. 1.

In certain embodiments, the right arm 13 comprises a second upper contact portion 20 and a second lower contact portion 21. The second upper and lower contact portions 20, 21 may be disposed on distal surfaces of the right arm 13. For example, the second upper and lower contact portions 20, 21 may be disposed on upper and lower distal surfaces of the right arm 13 as shown in FIG. 1. In certain embodiments, the positions of the second upper and lower contact portions 20, 21 is a mirror image of the positions of the first upper and lower contact portions 17, 18 about a center of the main body 11.

Figure 4:
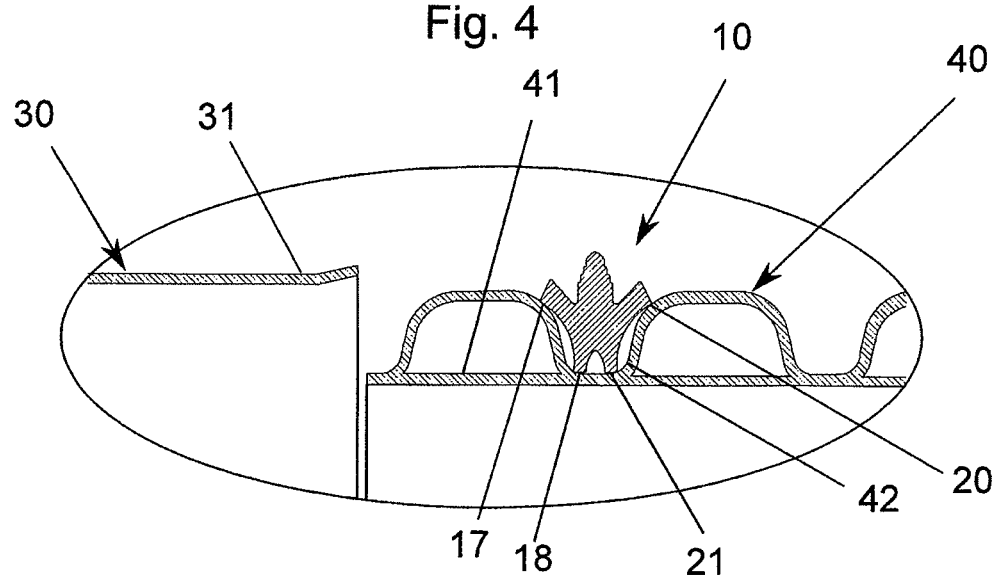
FIG. 4 is an enlarged view of the seal taken at section IV in FIG. 2.
Figure 5:
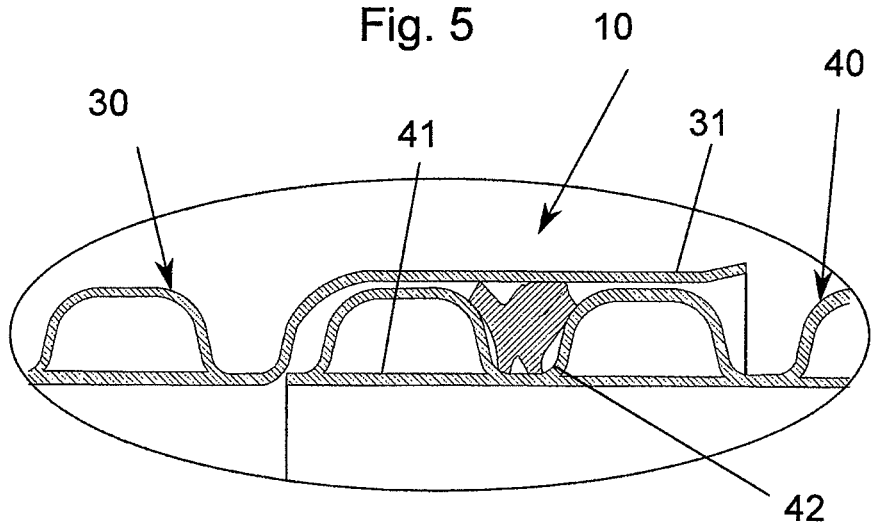
FIG. 5 is an enlarged view of the seal taken at section V in FIG. 3.

FIG. 2 is a cross-section view of the socket end 31 of the pipe 30 aligned with the spigot 41 end of the pipe 40 from FIG. 1 with the seal 10 disposed in the groove 42 of the spigot 41 end. FIG. 3 is a cross-section view of the socket end 31 of the pipe 30 and the spigot 41 end of the pipe 40 from FIG. 2 assembled and showing a portion of the lip 14 of the seal 10 bent towards the spigot 41 side of the assembly. FIG. 4 is an enlarged view of the seal 10 taken at section IV in FIG. 2. FIG. 5 is an enlarged view of the seal 10 taken at section V in FIG. 3.

As shown in FIGS. 2 and 4, the seal 10 is disposed in the groove 42 of the spigot 41. In certain embodiments, the first upper contact portion 17 and the second upper contact portion 20 are in contact with an upper portion of the groove 42. The first lower contact portion 18 and the second lower contact portion 21 are in contact with a lower portion of the groove 42. The contact between the first lower contact portion 18 and the second lower contact portion 21 with the lower portion of the groove 42 inhibits rotation of seal 10. In this way, the contact between the seal 10 at multiple locations on the surface of the groove 42 improves the stability of the seal 10 in the groove 42. In certain embodiments, the seal 10 completely locks up any remaining free space in the groove 42.

As depicted in FIGS. 3 and 5, the socket 31 of the pipe 30 is pushed into the spigot 41 of the pipe 40 during assembly. During assembly and once assembled, the lip 14 of the seal 10 is bent in the direction of the spigot 41. During assembly of the pipes 30, 40, primarily only the lip 14 portion of the seal 10 is bent which requires relatively low force. The low force eases assembly of the pipes 30, 40 as compared to compression type seals.

In certain embodiments during assembly, the first anti-rotation portion 16 of the left arm 12 contacts the socket 31 of the pipe 30 and together with the first lower contact portion 18 inhibits rotation of the seal 10 within the groove 42. Therefore, the seal 10 maintains a desired orientation in the groove 42 after assembly. For example, the seal 10 illustrated in FIG. 5 is disposed straight in the groove 42 except for the lip 14 being bent in the direction of the spigot 41. During assembly of the embodiment illustrated in FIG. 5, the first anti-rotation portion 16 of the left arm 12 contacts the socket 31 of the pipe 30 and together with the first lower contact portion 18 inhibits clockwise rotation of the seal 10 within the groove 42.

In certain embodiments, the first and second upper contact portions 17, 20 are configured to inhibit dirt, ice, etc. from entering the groove 42 before assembly.

As is illustrated in FIG. 3, the lip 14 is fully bent and sandwiched between the right arm 13 and the inside surface of the socket 31 end of the pipe 30. The right arm 13 is sandwich between the lip 14 and the top surface of the groove 42. In this way, the left and right arms 12, 13, and the lip 14, provide a complete seal between the pipes 30, 40. The lip 14, by virtue of its contact with the right arm 13, causes the right arm 13 to provide additional sealing against a top surface of the corrugation of the pipe 40 while the lip 14 seals against the inside surface of the socket 31 end. The bent lip 14 in FIG. 3 further causes the second lower contact portion 21 to seal against a bottom surface of the groove 42. In certain embodiments, the stress rips 14 improve the sealing performance of the lip 14 by providing focused contact locations with the inside surface of the socket 31. By focusing contact in this way the seal 10 is able to maintain its sealing function even when the seal 10 is exposed to high pressure.

The lip 14 assures adequate sealing even when the gap between the socket 31 and spigot 41 is large. For example, large gaps are created when a spigot 41 having a small diameter is inserted into a socket 31 having a large diameter. Additional deformation of the lip 14 of the seal 10 is required to seal these large gaps. In certain embodiments, the lip 14 of the seal 10 locks the pipes 30, 40 together in addition to providing a sealing function. For example, the bent lip 14 of the seal 10 resists the spigot 41 from being removed from the socket 31 once assembled.

In certain embodiments, the seal 10 comprises a relatively low volume of rubber while still achieving its sealing function. For example, the volume of the rubber can be about the same as the volume of the groove 42. In certain embodiments, the seal 10 can be employed between spigot 41 and socket 31 combinations that have minimum gaps. Minimum gaps occur when the assembly includes a spigot 41 having a large diameter and a socket 31 having a small diameter. The low rubber volume of the seal 10 also lowers the production costs as compared to compression seals.

The information in the disclosure and description of the invention itself are illustrative only of the application of the principles of the present invention. Other modifications and alternative embodiments may be devised by those skilled in the art without departing from the spirit and scope of the present invention.

Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, the skilled artisan will recognize the interchangeability of different embodiments. For example, various seals disclosed herein, as well as other known equivalents for each such feature, can be mixed and matched by one of ordinary skill in this art to construct seals in accordance with principles of the present invention.

Although this invention has been disclosed in the context of certain preferred embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims.

What is claimed is:

1. A seal for sealing between a first pipe having a groove and a second pipe having a socket, the socket being sized and shaped to cover the groove when the first and second pipes are assembled together, the seal comprising:
   a body;
   a left arm extending from the body and having an anti-rotation portion disposed at a distal upper edge;
   a right arm extending from the body and having an anti-rotation portion disposed at a distal upper edge; and
   a lip extending from the body between the left and right arms and having a length from the body so as to contact an inside surface of the socket and the distal upper edge of at least one of the left and rights arms when the first and second pipes are assembled together, wherein at least one of the anti-rotation portions of the left and right arms is configured to contact the inside surface of the socket to resist rotation of the seal in the groove when the first and second pipes are being assembled.

2. The seal of claim 1, wherein the seal has a symmetrical cross-sectional shape at least when the seal is not assembled between the first and second pipes.

3. The seal of claim 1, wherein the lip is configured to contact the inside surface of the socket and at least one of the left and right arms when the first and second pipes are assembled.

4. The seal of claim 3, wherein the contacted one of the left and right arms is configured to contact a top surface of the groove at least when the first and second pipes are being assembled.

5. The seal of claim 3, wherein the anti-rotation portion of the left and right arms not contacted by the lip is configured to contact the inside surface of the socket to resist rotation of the seal in the groove while the first and second pipes are being assembled.

6. The seal of claim 3, wherein the left arm comprises an upper contact portion and the right arm comprises an upper contact portion.

7. The seal of claim 6, wherein the upper contact portion of the left and right arms contacted by the lip is configured to contact a top surface of the groove at least when the first and second pipes are being assembled.

8. The seal of claim 1, wherein the left arm comprises a lower contact portion and the right arm comprises a lower contact portion.

9. The seal of claim 8, wherein the lower contact portion of at least one of the left and right arms is sized and shaped to contact a bottom surface of the groove at least when the first and second pipes are being assembled.

10. The seal of claim 1, wherein the lip comprises one or more stress rips.

11. The seal of claim 1, wherein the body, the lip, and the left and right arms have a W cross-sectional shape at least when the seal is not assembled between the first and second pipes.

12. A seal for sealing between a first pipe having a groove and a second pipe having a socket, the socket being sized and shaped to cover the groove when the first and second pipes are assembled together, the seal comprising:
a body having at least two anti-rotation portions and a lip disposed therebetween, the body having a W cross-sectional shape at least when the seal is not assembled between the first and second pipes, wherein the body comprises a first arm and a second arm, one of the at least two anti-rotation portions being disposed at a distal upper edge on the first arm and another one of the at least two anti-rotation portions being disposed at a distal upper edge on the second arm, the lip having a length from the body so as to contact an inside surface of the socket and the distal upper edge of at least one of the left and right arms when the first and second pipes are assembled together, at least one of the at least two anti-rotation portions is configured to contact an inside surface of the socket to resist rotation of the seal in the groove when the first and second pipes are being assembled.

13. The seal of claim 12, wherein the first arm comprises an upper contact portion and the second arm comprises an upper contact portion, and wherein at least one of the upper contact portion of the first arm and the upper contact portion of the second arm is sized and shaped to contact a top surface of the groove.

14. The seal of claim 12, wherein the first arm comprises a lower contact portion and the second arm comprises a lower contact portion, and wherein at least one of the lower contact portion of the first arm and the lower contact portion of the second arm is sized and shaped to contact a bottom surface of the groove.

15. The seal of claim 12, wherein the seal is symmetrical about the lip at least when the seal is not assembled between the first and second pipes.

16. A method of installing a seal between a first pipe having a groove and a second pipe having a socket, the socket being sized and shaped to cover the groove when the first and second pipes are assembled together, the method comprising:
providing a seal having a body, a left arm extending from the body and having an anti-rotation portion disposed at a distal upper edge, a right arm extending from the body and having an anti-rotation portion disposed at a distal upper edge, and a lip disposed between the left and right arms and having a length from the body so as to contact an inside surface of the socket and the distal upper edge of at least one of the left and rights arms when the first and second pipes are assembled together;
locating the seal in the groove so that the lip extends in a direction away from the groove;
contacting the lip of the seal with an inside surface of the socket so as to bend the lip to contact the distal upper edge of one of the left and right arms;
contacting the one of the left and right arms contacted by the lip with a top surface of the groove; and
contacting the anti-rotation portion of the one of the left and right arms not contacted by the lip with the inside surface of the socket so as to resist rotation of the seal in the groove while the first and second pipes are being assembled.

17. The method of claim 16, wherein the lip comprises one or more stress rips, and further comprising contacting the one or more stress rips with the inside surface of the socket.

18. The method of claim 16, wherein the body further comprises one or more lower contact portions, and further comprising contacting the one or more lower contact portions with a bottom of the groove so as to resist rotation of the seal in the groove while the first and second pipes are being assembled.

* * * * *